United States Patent [19]
Juergens

[11] 3,954,281
[45] May 4, 1976

[54] MUDFLAP MOUNTING ASSEMBLY

[75] Inventor: Alfred R. Juergens, Muskegon, Mich.

[73] Assignee: Fleet Engineers, Inc., Muskegon Heights, Mich.

[22] Filed: Feb. 24, 1975

[21] Appl. No.: 552,766

[52] U.S. Cl. .......................... 280/154.5 R; 248/204
[51] Int. Cl.² ......................................... B62D 25/16
[58] Field of Search .............. 280/154.5 R; 248/204

[56] References Cited
UNITED STATES PATENTS

| | | | |
|---|---|---|---|
| 2,652,266 | 9/1953 | Miller | 280/154.5 R |
| 2,801,867 | 8/1957 | Childreth | 280/154.5 R |
| 3,401,953 | 9/1968 | Prohl | 280/154.5 R |

*Primary Examiner*—Robert R. Song
*Attorney, Agent, or Firm*—McGarry & Waters

[57] ABSTRACT

A mudflap mounting assembly having a seat for mounting on a vehicle, a mudflap hanger assembly for mounting a mudflap and a spring biasing the hanger assembly to the seat. A tear-drop shaped seat has special guide flanges to guide seating of a face plate of the hanger assembly. The seat and face plate mounting allow approximately 90° deflection of the hanger assembly through a 360° angle with respect to the seat. The guide flanges provide for positive reseating of the hanger assembly in a given orientation with respect to the seat.

13 Claims, 3 Drawing Figures

U.S. Patent   May 4, 1976   3,954,281
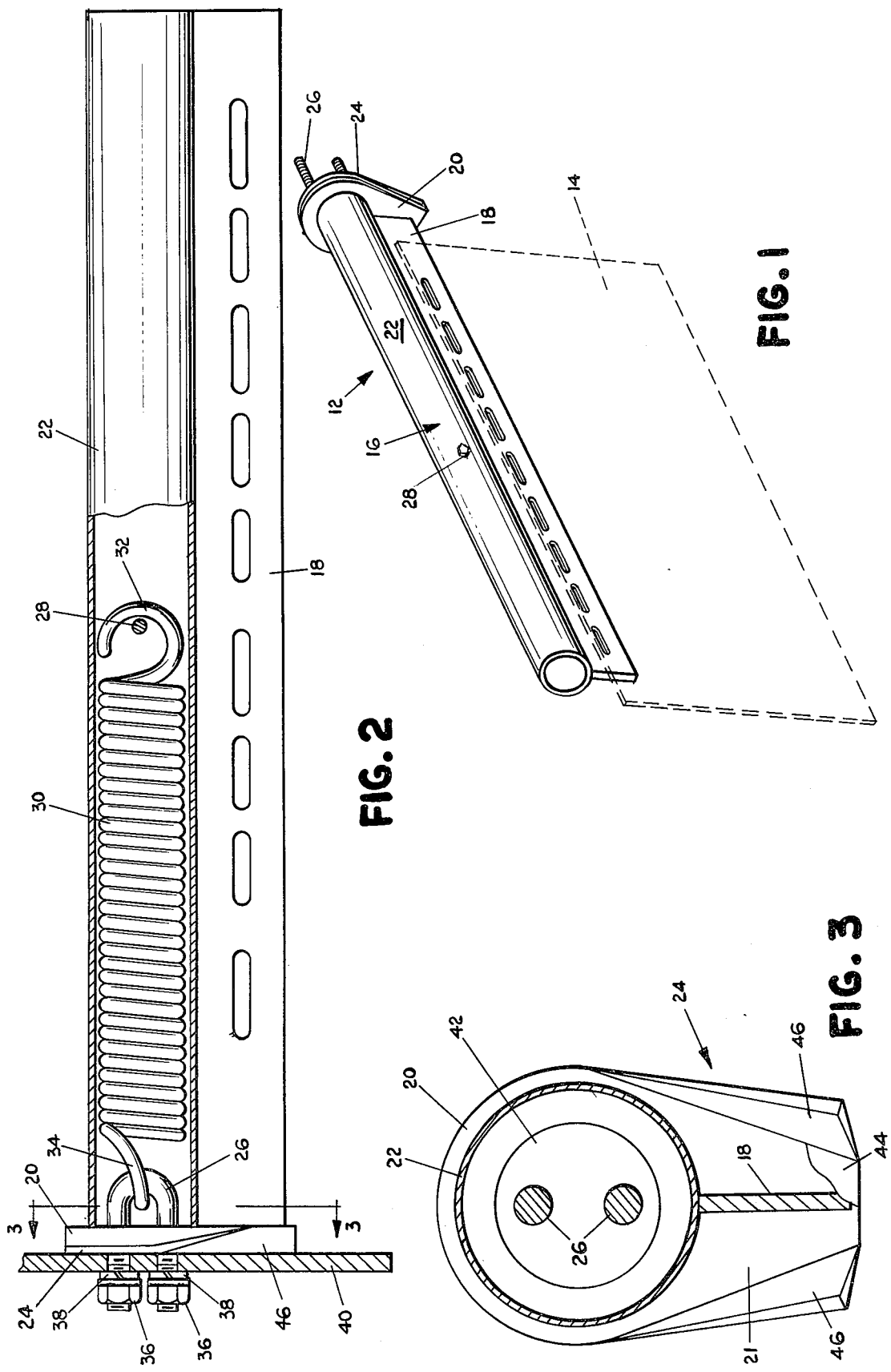

MUDFLAP MOUNTING ASSEMBLY

BACKGROUND OF THE INVENTION

1. Field of the Invention

This invention relates to a mudflap assembly wherein the mudflap mounting bracket is resiliently mounted to a seat for flexing action during operation of the vehicle.

2. State of the Prior Art

Mudguards or mudflaps are used primarily behind dual rear-wheeled truck and trailer vehicles. The mudflap support assemblies must have the ability to flex in forward and rear directions as well as in vertical directions. Some mudguard mounting structures comprise a single piece of spring-like bar stock bent in a shape for supporting the mudguards and for flexing in all directions. For example, see Betts, U.S. Pat. No. 2,970,849, issued Feb. 7, 1961, and Juergens, U.S. Pat. No. 3,782,757, issued Jan. 1, 1975.

Other mounting assemblies for mudflaps use a rigid hanger assembly and resiliently bias the hanger assembly to a seat which is attached to a vehicle. For example, see Prohl, et al, U.S. Pat. No. 3,401,953, issued Sept. 17, 1968. In such assemblies, provision must be made to permit the hanger assembly to flex with respect to the seat through an angle of substantially 360° about the seat. In other words, the mounting must permit the hanger to flex forward, backward, up and down with respect to the seat. Further, means must be provided for restraining rotational movement of the hanger assembly with respect to the seat so that the mudflap always remains in its vertical orientation. If the hanger rotates so that the flap moves toward the wheels, the wheels may prematurely wear the mudflap away. If the hanger rotates in an opposite direction, the effectiveness of the mudflap may be diminished.

In the Prohl et al structure, the seat comprises a round plate and the hanger includes an elongated tube which fits over the round plate. A coil spring fits within the tube with one end of the coil spring being retained by a hook on the seat and the other end of the coil spring being retained midway in the elongated tube. In one embodiment, a retainer within the tube grips the end of the spring and restrains rotation of the spring with respect to the tube. In another embodiment, a special rigid link is connected to the inner end of the coil spring and a pin extends through a slot in the link and through the hollow tube to restrain rotation of the spring with respect to the tube.

The former spring restraint is fairly ineffective to prevent small deviations in alignment of the hanger assembly with respect to the seat. The latter spring restraint is also ineffective to prevent such small deviations because of the required tolerance between the hook on the rigid link and the hook on the metal plate. Further, the possibility exists that the hollow tube will not completely seat back over the round plate at the conclusion of any flexing cycle because of the apparent close fit of the hollow tube over the round plate.

SUMMARY OF THE INVENTION

According to the invention a mudflap assembly has a seat for attaching to a vehicle, a mudflap hanger assembly including means for mounting a mudflap thereon, and means for resiliently mounting the hanger to the seat wherein the seat flexes under normal operating conditions yet returns to abutting contact with the seat, the seat having a rimless portion and lower elongated portion, preferably tapered, with guide means extending outwarding thereof. The hanger assembly includes a face plate shaped to fit snugly within the guide means when in seating contact with the seat and in only one predetermined orientation. The resilient mounting means biases the face plate into seating contact with the seat so that the seat guides the face plate into the predetermined orientation with respect to the seat after flexing of the hanger assembly.

Desirably, the seat has a tapered, elongated flat lower portion and the guide means extends outwardly from the edges of the flat lower portion. The guide means desirably are slanted outwardly with respect to the flat lower portion and the face plate has an elongated, tapering flat portion substantially congruent with the flat lower portion of the seat.

In a specific embodiment of the invention the seat and the face plate are tear-drop shaped in configuration.

Desirably, the hanger mounting means includes a U-bolt having a bight portion projecting outwardly from the seat and having legs extending through the seat and providing means for attaching the seat to the vehicle. The hanger assembly further includes a hollow tube and a coil spring is positioned within the hollow tube. A hook on one end of the coil spring is positioned around and retained by the bight end of the U-bolt and a hook at the other end of the coil spring engages a bolt which extends through the hollow tube.

DESCRIPTION OF DRAWINGS

The invention will now be described with reference to the accompanying drawings in which:

FIG. 1 is a perspective view of a mudflap bracket according to the invention;

FIG. 2 is a side elevational view partially in section, of the bracket illustrated in FIG. 1; and FIG. 3 is a sectional view taken along lines 3—3 of FIG. 2.

DESCRIPTION OF THE PREFERRED EMBODIMENT

Referring now to the drawings and to FIG. 1 in particular there is shown a mudflap mounting bracket 12 which mounts a mudflap 14 (shown in phantom lines). The mudflap bracket 12 includes a hanger assembly 16 having a slotted flange 18, a tear-drop shaped face plate 20 and a hollow tube 22. The face plate 20 and the slotted flange 18 are welded to the hollow tube 22. The mudflap 14 can be secured to the flange 18 through bolts (not shown). The slots in flange 18 permit different mudflaps to be hung therefrom and permit some lateral adjustment of the mudflap. A seat assembly also forms a portion of the mudflap bracket 12 and comprises a tear-drop shaped seat plate 24 and a U-bolt 26.

As illustrated in FIG. 2, to which reference is now made, a bolt 28 extends through a central portion of the hollow tube 22. A coil spring 30 has a hook 32 at one end which engages the bolt 28 and a hook 34 at the other end which engages the U-bolt 26. The coil spring is tensioned between the U-bolt 26 and the bolt 28 to resiliently bias the hanger assembly 16 to the seat assembly. The seat assembly is mounted to a frame bracket 40 of the vehicle through the U-bolt 26 which extends through the holes in the frame bracket 40.

The U-bolt 26 is welded to the tear-drop shaped seat plate 24 and is threaded at the outer portions thereof to receive nuts 36. The U-bolt is positioned so the legs thereof are in a vertical plane. Lock washers 38 desirably are provided on the ends of the U-bolt 26 in order to lock the nuts 36 onto the ends of the U-bolt 26. In this manner, the seat assembly is secured to the frame bracket 40.

As illustrated in FIG. 3, the tear-drop shaped seat 24 has an upper rimless portion and a tapering lower portion 44 which is defined and framed by up-turned slanted guide flanges 46. The tear-drop shaped face plate 20 has a tapering lower portion 21 of the same general configuration as the flat lower portion 44 of the tear-drop shaped seat 24 and fits snugly between the slanted guide flanges 46 thereof. A circular opening 42 is provided in the face plate 20 to permit the U-bolt 26 to extend therethrough with a slight space left between the U-bolt and face plate to permit movement of the face plate 20 with respect to the seat 24.

In operation, the hanger assembly 16 will flex with respect to the seat 24 against the tension of spring 30. The flexing takes place by pivoting of the hanger assembly 16 about an edge of the face plate 20 and can take place in any direction on the face plate 20. Further, if necessary, the flexible mounting permits substantially a full 90° flex of the hanger assembly 16 in any direction on the face plate 20. Normally, the flexing operation results in a tendency of the hanger assembly 16 to twist about the axis of the hollow tube 22 with respect to the face plate 20. However, the up-turned slanted guide flanges 46 provide positive seating of the face plate 20 in the seat plate 24 so that the orientation of the bracket remains in vertical position. Thus, after each flexing of the hanger assembly 16, the guide flanges 46 gently direct the bottom portion 21 of the face plate 20 into the proper congruent relationship with the seat 24. The guide flanges 46 are tapered toward its top portion to allow the coil spring to return the bottom portion 21 of the face plate 20 by rotation into proper congruent relationship with the seat 24 when the face plate is dislocated by rotation beyond contact with the guide flanges 46.

The mudflap assembly described above provides a simple, economic, yet effective, means for supporting a mudflap. A minimum mounting area assembly is provided by the U-bolt construction and the assembly provides for an unrestricted 90° deflection through an angle of 360° with positive reseating of the hanger assembly on the seat in a desired orientation. Small deviations from the required orientation are substantially eliminated. The hanger assembly can be attached to aluminum or steel frame vehicle and a separate wear plate is not required for aluminum frame vehicles. Although the mudflap mounting assembly is easily attached to the vehicle, it is not servicable with simple tools. Special in-shop tools and equipment are required to replace the spring and thus tampering by inexperienced mechanics is minimized.

Reasonable variation and modification are possible within the scope of the foregoing disclosure without departing from the spirit of the invention which is defined by the appended claims.

The embodiments of the invention in which an exclusive property or pivilege is claimed are defined as follows:

1. In a mudflap assembly having a seat for attaching to a vehicle, a mudflap hanger assembly including means for mounting a mudflap thereon, means for resiliently mounting said hanger to said seat wherein said hanger assembly flexes under normal operation conditions, yet returns to abutting contact with the seat, the improvement which comprises:

said seat having an upper rimless flat portion and an elongated lower portion with guide means extending outwardly of said lower portion;

said hanger assembly further including a face plate shaped to fit snugly within said guide means when in seating contact with said seat and in only one predetermined orientation;

said resilient mounting means biasing said face plate into seating contact with said seat, whereby said seat guides said face plate into said predetermined orientation with respect to said seat after flexing of said hanger assembly.

2. A mudflap assembly according to claim 1 wherein said seat has a tapered elongated flat lower portion and said guide means extends outwardly from the edges of said lower portion.

3. A mudflap assembly according to claim 2 wherein said guide means are slanted outwardly and laterally with respect to said flat portion.

4. A mudflap assembly according to claim 3 wherein said face plate has an elongated tapering flat portion substantially congruent with said flat portion of said seat.

5. A mudflap assembly according to claim 2 wherein said seat has a flat tear-drop shaped portion in abutting relationship with said face plate.

6. A mudflap assembly according to claim 5 wherein said face plate is also tear-drop shaped and has an outer configuration substantially congruent with said tear-drop shaped portion of said seat.

7. A mudflap assembly according to claim 2 wherein said face plate has an elongated tapering flat portion substantially congruent with said flat portion of said seat.

8. A mudflap assembly according to claim 1 wherein said hanger mounting means includes a U-bolt, a bight portion thereof projecting outwardly from said seat and legs thereof extending through said seat, said legs providing means for attaching said seat to a vehicle.

9. A mudflap assembly according to claim 8 wherein said hanger assembly includes a hollow tube; said hanger mounting means further incldues a coil spring positioned within said hollow tube and having a hook at one end positioned around and retained by the bight end of said U-bolt, said coil spring further having a hook at the other end; means extending through said tube retaining said hook of said coil spring within said hollow tube so that said spring is under tension.

10. A mudflap assembly according to claim 9 wherein said seat has a flat tear-drop shaped portion in abutting relationship to said face plate; and said face plate is also tear-drop shaped and has an outer dimension substantially congruent with said tear-drop shaped seat portion.

11. A mudflap assembly according to claim 1 wherein said elongated portion of said seat is tapered.

12. A mudflap assembly according to claim 2 wherein said guide means are tapered toward the upper rimless portion of seat to allow self return of the face plate when dislocated beyond contact with the guide means.

13. A mudflap assembly according to claim 1 wherein said guide means are tapered toward the upper rimless portion of seat to allow self return of the face plate when dislocated beyond contact with the guide means.

* * * * *